United States Patent [19]
McLarty

[11] 4,127,183
[45] Nov. 28, 1978

[54] SILENCER DEVICE
[75] Inventor: Tom E. McLarty, Louisville, Ky.
[73] Assignee: American Air Filter Company, Inc., Louisville, Ky.
[21] Appl. No.: 878,818
[22] Filed: Feb. 17, 1978
[51] Int. Cl.² .............................................. G01S 9/66
[52] U.S. Cl. ................................... 181/224; 181/247; 181/257; 181/267; 181/282; 181/286
[58] Field of Search ............... 181/218, 220, 222, 224, 181/284, 293

[56] References Cited
U.S. PATENT DOCUMENTS

| 2,299,112 | 10/1942 | Schilling | 181/224 |
| 2,489,048 | 11/1949 | Rinehart | 181/224 |
| 2,595,047 | 4/1952 | Beranek | 181/286 |
| 3,019,850 | 2/1962 | March | 181/224 |
| 3,895,686 | 7/1975 | Savkar et al. | 181/224 |

Primary Examiner—L. T. Hix
Assistant Examiner—Benjamin R. Fuller
Attorney, Agent, or Firm—Jon C. Winger

[57] ABSTRACT

A silencer device for attenuating fluid borne noise has a flow through housing with an open upstream end for the entrance of a fluid into the housing and a coaxial open downstream end for exhausting the fluid from the housing. An entrance header formed of a plurality of spaced apart intersecting elongated members defining a plurality of rectangular entrance apertures, each elongated member having a V-shaped transverse cross-section shape and oriented with its apex pointed in an upstream direction, is coextensively disposed over the upstream open end. An exhaust header also formed of a plurality of spaced apart intersecting elongated members defining a plurality of rectangular exhaust apertures, each elongated member having a V-shaped transverse cross-section shape and oriented with its apex pointed in a downstream direction, is coextensively disposed over the downstream open end. A plurality of open ended fluid flow tubes having perforated longitudinal walls extends between the entrance header and exhaust header. Each flow tube has one of its open ends in registration with a different one of the rectangular entrance apertures of the entrance header. Likewise, the opposite open end of each flow tube is in registration with a different one of the rectangular exhaust apertures of the exhaust header. The interior of the housing is packed with a sound absorbing material to surround the perforated longitudinal walls of the flow tubes.

9 Claims, 5 Drawing Figures

SILENCER DEVICE

BACKGROUND OF THE INVENTION

Silencer devices for attenuating fluid borne noises are not, in and of themselves, new. Examples of heretofore known silencer devices of this type are shown in U.S. Pat. Nos. 2,940,537 issued on June 14, 1960 to C. D. Smith et al; 2,988,302 issued on June 13, 1961 to C. D. Smith; and 3,019,850 issued on Feb. 6, 1962 to J. J. March. In those heretofore known silencer devices having flow tubes attached to headers, the headers are of unitary construction material. Thus, in order to manufacture a family of silencer devices of different sizes, i.e., having differing numbers of flow tubes from one another, different manufacturing tooling, such as, for example, a metal forming die, must be used for each different sized header. This requires a proliferation of tooling and is therefore costly. Because it is costly and time consuming to set up manufacturing tooling, it is more efficient to manufacture more headers of a given size than may be needed at the time of manufacture and to put the excess number of headers in inventory for future use when needed. This solution is also expensive.

SUMMARY OF THE INVENTION

The present invention recognizes the drawbacks of the prior art and provides a silencer device having a header construction which is economical to manufacture in any size, i.e., for accommodating any number of flow tubes without the necessity of changing tooling.

More particularly, the present invention is a silencer device for attenuating fluid borne noises, comprising:

(a) a flow through housing having an open upstream end for the entrance of a fluid into the silencer device and an open downstream end for the exhausting of the fluid from the silencer device coaxial with the open upstream end;

(b) a fluid entrance header disposed coextensively across the open upstream end of the housing and connected to the housing, the fluid entrance header comprising:

a plurality of parallel spaced apart first elongated members, each first elongated member having a V-shaped transverse cross-section; and, a plurality of parallel spaced apart second elongated members normally disposed to and intersecting the plurality of first elongated members, each of the second elongated members having a V-shaped transverse cross-section with an included angle generally equal to the included angle of the V-shaped cross-section of the first elongated members, each of the second elongated members having formed therein a plurality of pairs of transversely aligned V-shaped notches longitudinally spaced apart along its length, the configuration of each pair of notches conforming of the V-shaped cross-section of the first elongated members, each pair of V-shaped notches in each second elongated member nestingly receives a different one of the first elongated members; and, (c) a fluid exhaust header disposed coextensively across the open downstream end of the housing and connected to the housing, the fluid exhaust header comprising:

a plurality of parallel spaced apart third elongated members, each third elongated member having a V-shaped transverse cross-section; and, a plurality of parallel spaced apart fourth elongated members normally disposed to and intersecting the plurality of third elongated members, each of the fourth elongated members having a V-shaped transverse cross-section with an included angle substantially equal to the included angle of the V-shaped cross-section of the third elongated members, each of the fourth elongated members having formed therein a plurality of pairs of aligned V-shaped notches longitudinally spaced apart along its length, the configuration of each pair of notches conforming to the V-shaped cross-section of the third elongated members, each pair of V-shaped notches in each fourth elongated member nestingly receives a different one of the third elongated members.

BRIEF DESCRIPTION OF THE DRAWINGS

A better understanding of the present invention will be had upon reference to the following specification and accompanying drawing wherein like numerals refer to like parts throughout the several views and in which.

DETAILED DESCRIPTION OF THE PREFERRED EMBODIMENT

Figure 1:
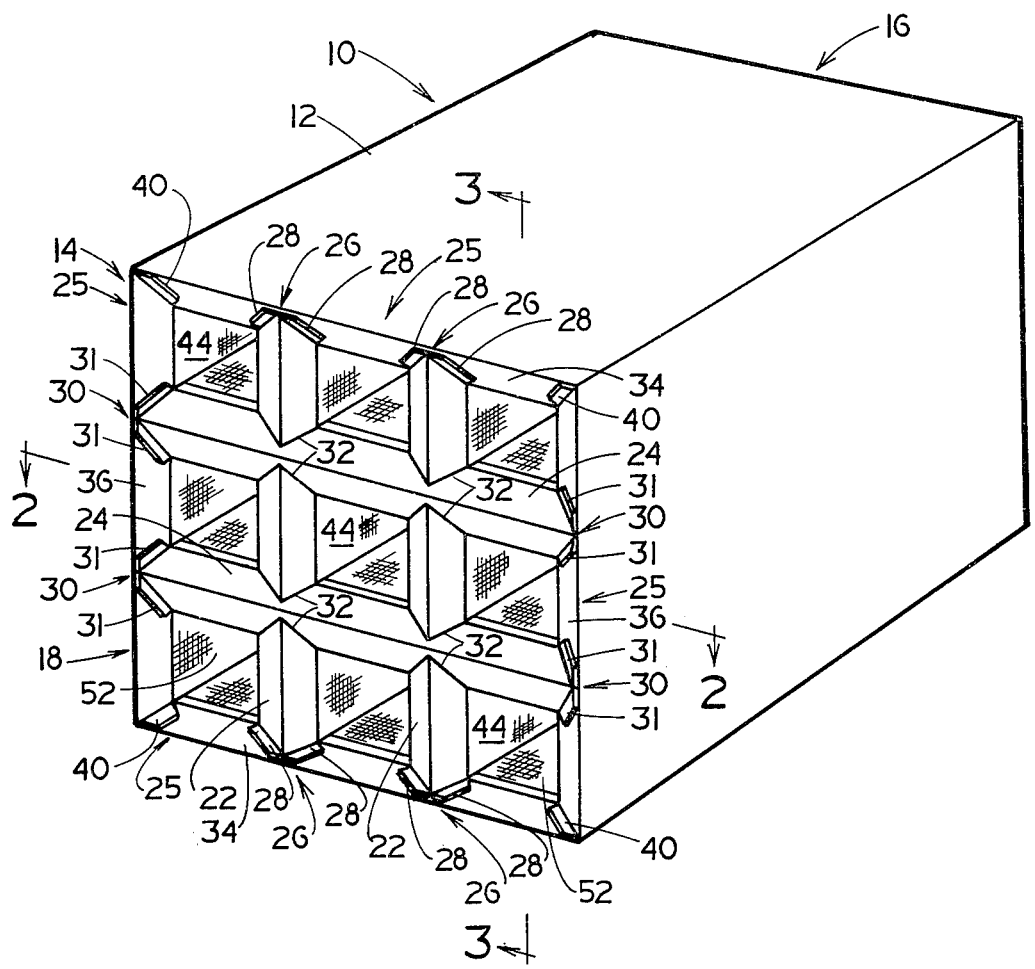
FIG. 1 is a perspective view of a silencer device employing the present invention.
Figure 2:
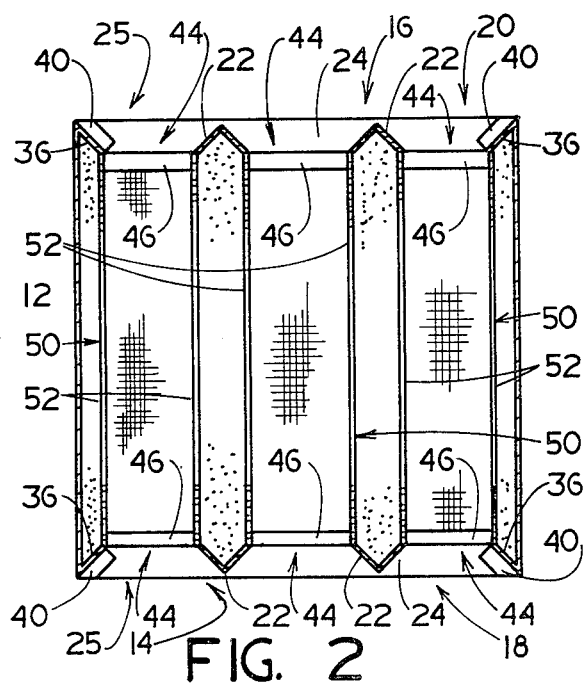
FIG. 2 is a transverse cross-section as viewed in the direction of arrows 2—2 in FIG. 1.
Figure 3:
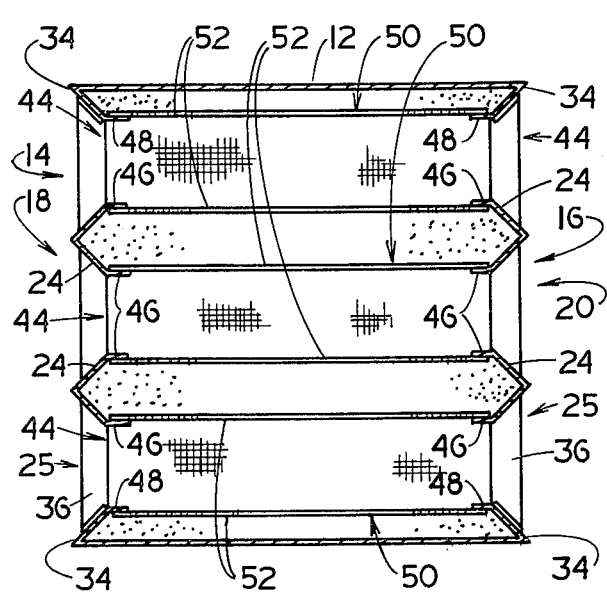
FIG. 3 is a transverse cross-section as viewed in the direction of arrows 3—3 in FIG. 1.
Figure 4:
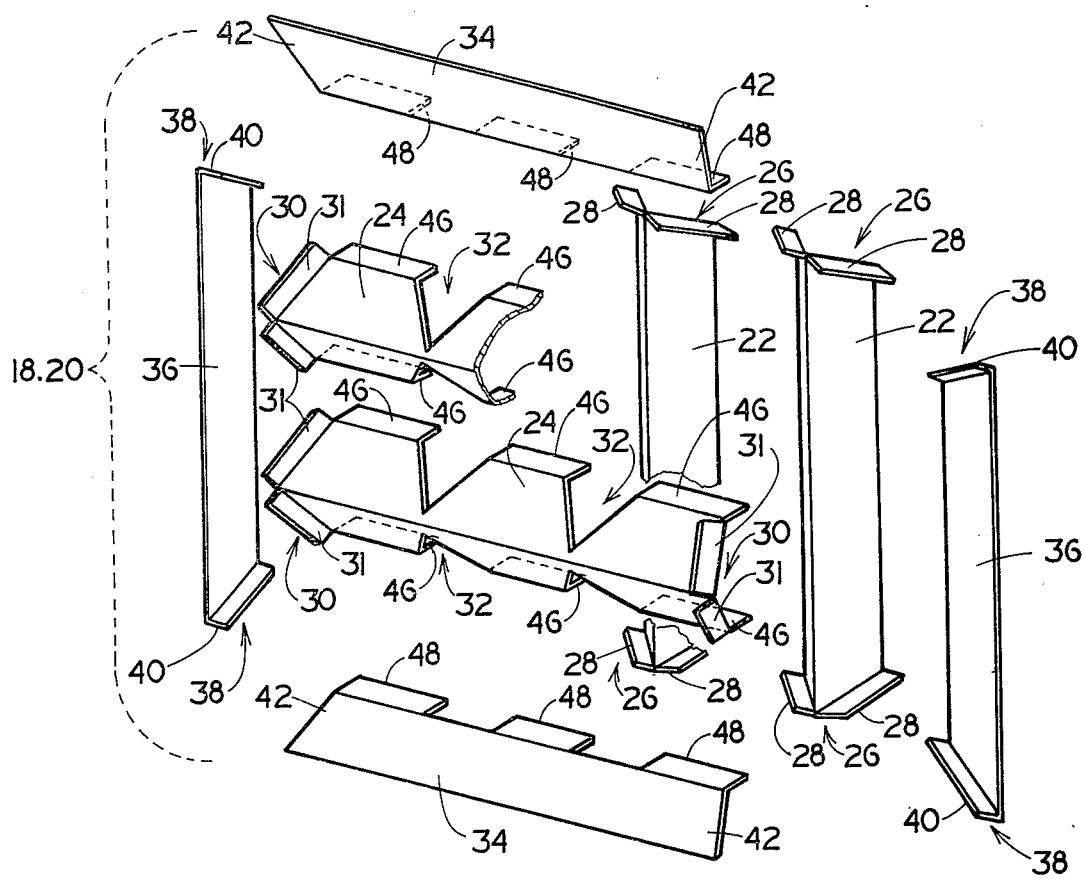
FIG. 4 is an exploded perspective view of a header of the silencer device.
Figure 5:
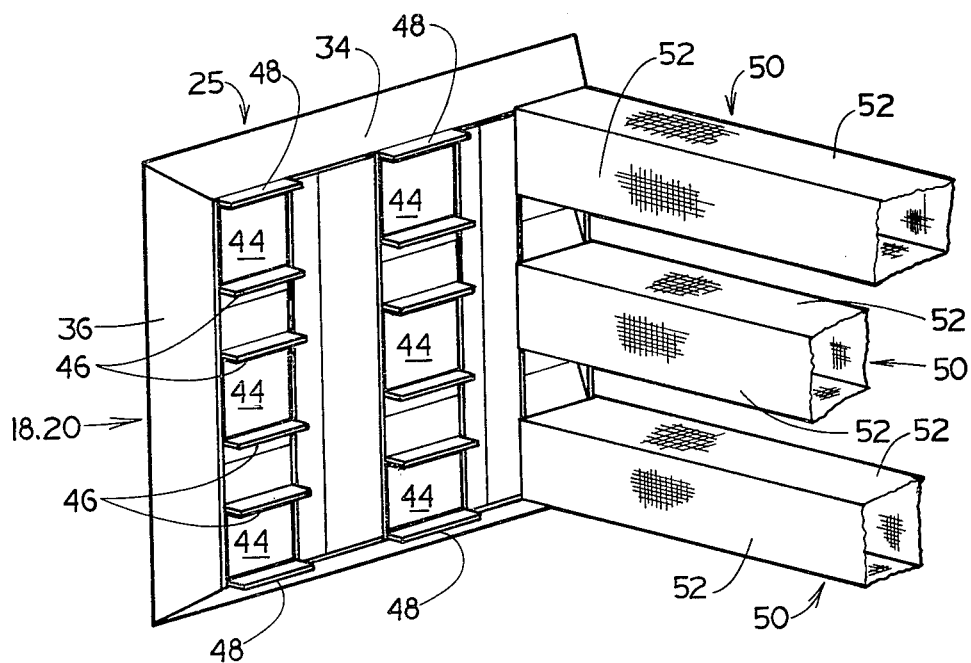
FIG. 5 is a perspective view of the silencer device with exterior parts removed to show interior detail.

FIG. 1 is a perspective view of a silencer device, generally denoted as the numeral 10, for attenuating fluid borne noises. The silencer device 10 has a flow through housing 12 illustrated as being generally rectangular in transverse cross-section and having an open upstream end 14 providing for the entrance of a fluid into the housing, and an open downstream end 16 coaxial with the open upstream end 14 providing for the exhausting of fluid from the housing. A fluid inlet header 18 is disposed coextensively across the upstream end 14 of the housing 12 and a similar fluid exhaust header 20 is disposed coextensively across the downstream end 16 of the housing 12. The housing 12 and headers 18 and 20 can be fabricated of sheet metal and fastened together by virtually any convenient means such as, for example, sheet metal screws, pop rivets, soldering or the like.

As can be best seen in FIGS. 1, 2, 3 and 4, the fluid inlet header 18 is formed of parallel spaced apart first elongated members 22, parallel spaced apart second elongated members 24, each one being normally disposed to and intersecting the first elongated members 22 and a peripheral frame 25 surrounding the intersecting first and second elongated members 22 and 24 and attached to the ends of the first and second elongated members.

Each first elongated member 22 has a V-shaped transverse cross-section and each end is chamfered, as denoted by the numeral 26, with a slope substantially equal to one half of the included angle of the V-shaped cross-section of the first elongated members 22. Each chamfered end 26 has two oppositely extending attaching flanges 28 projecting generally transversely of the longitudinal axis of the first elongated member 22 in a direction generally outwardly from the first elongated member so that the angle formed between each flange 28 and the sloping surface of the first elongated member from which it extends is substantially normal.

Each second elongated member 24 has a V-shaped transverse cross-section with an included angle generally equal to the included angle of the V-shaped cross-section of the first elongated members 22. Each end of each second elongated member 24 is chamfered, as denoted by the numeral 30, with a slope substantially equal to one half of the included angle of the V-shaped cross-section of the second elongated member 24. Each chamfered end 30 has two oppositely extending attaching flanges 31 projecting generally transversely of the longitudinal axis of the second elongated member 24 in a direction generally outwardly from the second elongated member so that the angle formed between each flange 31 and the sloping surface of the second elongated member from which it extends is substantially normal.

Further, each of the second elongated members 24 is formed with a plurality of pairs of V-shaped notches 32, with the individual notches of a pair being mutually aligned transversely to the longitudinal axis of the second elongated member 24, and the pairs of notches being spaced apart from each other along the longitudinal axis of the second elongated member. The configuration of the notches 24 conform to the V-shaped cross-section of the first elongated members 22. Each pair of notches 32 in a second elongated member nestingly receives a different one of the first elongated members 22.

The peripheral frame 25 comprises a pair of spaced apart parallel first elongated generally planar members 34 and a pair of spaced apart parallel second elongated generally planar members 36 normally disposed to the first elongated members 34. Each first elongated generally planar member 34 is disposed parallel to the second elongated members 24 with one of the first planar members 34 being attached to one of the chamfered ends 26 of each of the first elongated members 22, and the other one of the first planar members 34 being attached to the other one of the chamfered ends 26 of each of the first elongated members 22.

The flanges 28 at the chamfered ends 26 of the first elongated members 22 lie in confronting abutment with the first elongated planar members 34 and are attached to the first elongated planar members 34 by means of, for example, sheet metal screws or rivets. Each elongated generally planar second member 36 is disposed parallel to the first elongated members 22 with one of the second planar members 36 being attached to one of the chamfered ends 30 of each of the second elongated members 24, and the other one of the second planar members 36 being attached to the other one of the chamfered ends 30 of each of the second elongated members 24. The flanges 31 at the chamfered ends 30 of the second elongated members 24 lie in confronting abutment with the second elongated planar members 36 and are attached to the second elongated planar members 36 by means of, for example, sheet metal screws or rivets. In addition, each end 38 of the second elongated planar members 36 is chamfered with a slope substantially equal to the slope of the chamfered ends 26 of the first elongated members 22. Each chamfered end 38 has an attaching flange 40 extending generally transversely to the longitudinal axis of the second elongated planar member 36 so that the angle formed between each flange and the planar surface of the second planar elongated member is substantially normal. The flanges 40 at the chamfered ends 38 of the second elongated planar member 36 lie in confronting abutment with the ends 42 of the first elongated planar members 34 adjacently disposed thereto, and are attached to the ends 42 of the first elongated planar members 34 by means of, for example, sheet metal screws or rivets.

The intersecting first and second elongated members 22 and 24 cooperate with each other and at their ends with the first and second elongated planar members 34 and 36 of the peripheral frame 25 to define a generally rectangular array of generally rectangular entrance apertures 44. In addition, the first and second elongated members 22 and 24 are each oriented so that the apex of their V-shaped cross-sections is pointed outwardly, i.e., in an upstream direction, of the open upstream end 14 of the housing 12 so that the generally rectangular entrance apertures converge in a direction into the housing or in a downstream direction.

The fluid outlet header 20 is identical in construction to the fluid inlet header 18 and is formed of parallel spaced apart first elongated members 22, parallel spaced apart second elongated members 24, each one being normally disposed to and intersecting the first elongated members 22, and a peripheral frame 25 surrounding the intersecting first and second elongated members 22, 24 and attached to the ends of the first and second elongated members.

Each first elongated member 22 has a V-shaped transverse cross-section and each end is chamfered, as denoted by the numeral 26, with a slope substantially equal to one half of the included angle of the V-shaped cross-section of the first elongated members 22. Each chamfered end 26 has two oppositely extending attaching flanges 28 projecting generally transversely of the longitudinal axis of the first elongated member 22 in a direction generally outwardly from the first elongated member so that the angle formed between each flange 28 and the sloping surface of the first elongated member from which it extends is substantially normal.

Each second elongated member 24 has a V-shaped transverse cross-section with an included angle generally equal to the included angle of the V-shaped cross-section of the first elongated member 22. Each end of each second elongated member 24 is chamfered, as denoted by the numeral 30, with a slope substantially equal to one half of the included angle of the V-shaped cross-section of the second elongated member. Each chamfered end 30 has two oppositely extending attaching flanges 31 projecting generally transversely of the longitudinal axis of the second elongated member in a direction generally outwardly from the fourth elongated member so that the angle formed between each flange 31 and the sloping surface of the second elongated member from which it extends is substantially normal.

Further, each of the second elongated members 24 is formed with a plurality of pairs of V-shaped notches 32, with the individual notches of a pair being mutually aligned transversely to the longitudinal axis of the second elongated member, and the pairs of notches being spaced apart from each other along the longitudinal axis of the second elongated member. The configuration of the notches 32 conform to the V-shaped cross-section of the first elongated members 22. Each pair of notches 32 in a second elongated member nestingly receives a different one of the first elongated members 22.

The peripheral frame 25 comprises a pair of spaced apart parallel first elongated generally planar members 34 and a pair of spaced apart parallel second elongated generally planar members 36 normally disposed to the first pair of planar members 34 and attached at their ends to the adjacent ends of the first pair of planar members 34. Each first elongated generally planar member is disposed parallel to the second elongated members 36 with one of the first planar members 34 being attached to one of the chamfered ends 26 of each of the first elongated members 22, and the other one of the first planar members 34 being attached to the other one of the chamfered ends 26 of each of the first elongated members 22.

The attaching flanges 28 at the chamfered ends 26 of the first elongated members 22 are in confronting abutment with the first planar members 34 and are attached to the first elongated planar members 34 by means of, for example, sheet metal screws or rivets. Each elongated generally planar second member 36 is disposed parallel to the first elongated members 22 with one of the second planar members 36 being attached to one of the chamfered ends 30 of each of the second elongated members 24, and the other one of the second planar members 36 being attached to the other one of the chamfered ends 30 of each of the second elongated members 24. The attaching flanges 31 at the chamfered ends 30 of the second elongated members 24 lie in confronting abutment with the second elongated planar members 36 and are attached to the second elongated planar members 36 be means of, for example, sheet metal screws or rivets. In addition, each end 38 of the second elongated planar members 36 is chamfered as at numeral 38 with a slope substantially equal to the slope of the chamfered ends 26 of the first elongated members 22. Each chamfered end 38 has an attaching flange 40 extending generally transversely to the longitudinal axis of the second elongated planar member so that the angle formed between each attaching flange 40 and the planar surface of the second elongated member is substantially normal. The attaching flanges 40 at the chamfered ends 38 of the second elongated planar members 36 lie in confronting abutment with the first planar members 34 at its ends 42 adjacently disposed thereto, and are attached to the ends 42 of the first planar members 34 by means of, for example, sheet metal screws or rivets.

The intersecting first and second elongated members 22, 24 cooperate with each other and at their ends with the peripheral frame 25 to define a generally rectangular array of generally rectangular exit apertures 44. In addition, the first and second elongated members 22 and 24 are each oriented so that the apex of their V-shaped cross-section is pointed outwardly, i.e., in a downstream direction, of the open downstream end 16 of the housing 12 so that the generally rectangular exit apertures 44 diverge in a direction out of the housing or in a downstream direction. The inlet header 18 and outlet header 20 are disposed at their respective ends of the housing 12 so that each one of the generally rectangular entrance apertures 44 of the inlet header 18 is in alignment and registration with a different one of the generally rectangular exit apertures 44 of the outlet header 20.

Each second elongated member 24 of the inlet header 18 has a mounting flange 46 extending from between adjacent longitudinally spaced apart notches of each longitudinally spaced apart pair of V-shaped notches 32 in a direction axially of the housing 12 toward the open downstream end 16 of the housing 12. Likewise, each one of the pair of first elongated generally planar members 34 comprises a like number of spaced apart mounting flanges 48 extending in a direction axially of the housing 12 toward the open downstream end 16 of the housing 12. Each mounting flange 48 is parallel to and in lateral registration with a different one of the mounting flanges 46 of the adjacent second elongated member 24. Thus, two opposite sides of each generally rectangular entrance aperture 44 of the inlet header 18 are bordered by one mounting flange 46 and one mounting flange 48.

Similarly, each second elongated member 24 of the outlet header 20 has a mounting flange 46 extending from between adjacent longitudinally spaced apart notches of each longitudinally spaced apart pair of V-shaped notches 32 in a direction axially of the housing 12 toward the open upstream end 14 of the housing 12. Each one of the pair of first elongated generally planar members 34 comprises a like number of spaced apart mounting flanges 48 extending in a direction axially of the housing 12 toward the open upstream end 14 of the housing 12. Each mounting flange 48 is parallel to and in lateral registration with a different one of the mounting flanges 46 of the adjacent second elongated member 24. Thus, two opposite sides of each generally rectangular exit aperture 44 of the outlet header 20 are bordered by one mounting flange 46 and one mounting flange 48.

A plurality of parallel elongated open ended fluid flow tubes 50 interconnect the fluid inlet header 18 with the fluid outlet header 20 to provide a plurality of flow paths through the housing 12. Each of the fluid flow tubes has foraminous longitudinal walls 52 and a generally rectangular cross-sectional shape which corresponds in size and configuration to the rectangular entrance apertures 44 of the inlet header 18 and rectangluar exit apertures 44 of the outlet header 20. One open end of each flow tube 50 is in registration with and, thus, open to a different one of the rectangular entrance apertures 44 of the inlet header 18 and the other open end is in registration with and, thus, open to the rectangular exit aperture 44 of the outlet header 20 which is in alignment with that entrance aperture 44 of the inlet header 18. The mounting flanges 46 and 48 bordering each entrance aperture 44 of the inlet header 18 are in abutting juxtaposition with the longitudinal walls 52 of the flow tube in registration with the entrance aperture proximate its open end. Similarly, the mounting flanges 46 and 48 bordering each exit aperture 44 of the outlet header 20 are in abutting juxtaposition with the longitudinal walls 52 of the flow tube in registration with that exit aperture proximate its open end. Each flow tube 50 is attached to the mounting flanges 46 and 48 of the inlet and outlet headers by any convenient means such as, for example, sheet metal screws or rivets.

The interior of the housing 12 surrounding the flow tubes 50 is filled with a sound absorbing material.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

I claim:

1. A silencer device for attenuating fluid borne noises, comprising:
   (a) a flow through housing having an open upstream end for the entrance of a fluid into the silencer device and an open downstream end for the exhausting of the fluid from the silencer device coaxial with the open upstream end;

(b) a fluid entrance header disposed coextensively across the open upstream end of the housing and connected to the housing, the fluid entrance header comprising:

a plurality of parallel spaced apart first elongated members, each first elongated member having a V-shaped transverse cross-section; and, a plurality of parallel spaced apart second elongated members normally disposed to and intersecting the plurality of first elongated members, each of the second elongated members having a V-shaped transverse cross-section with an included angle generally equal to the included angle of the V-shaped cross-section of the first elongated members, each of the second elongated members having formed therein a plurality of pairs of transversely aligned V-shaped notches longitudinally spaced apart along its length, the configuration of each pair of notches conforming to the V-shaped cross-section of the first elongated member nestingly receives a different one of the first elongated members;

the first elongated members and second elongated members of the entrance header cooperate to define a plurality of generally rectangular entrance apertures.

2. A fluid exhaust header disposed coextensively across the open downstream end of the housing and connected to the housing, the fluid exhaust header comprising:

a plurality of parallel spaced apart first elongated members, each first elongated member having a V-shaped transverse cross-section; and, a plurality of parallel spaced apart second elongated members normally disposed to and intersecting the plurality of first elongated members, each of the second elongated members having a V-shaped transverse cross-section with an included angle substantially equal to the included angle of the V-shaped cross-section of the first elongated members, each of the second elongated members having formed therein a plurality of pairs of aligned V-shaped notches longitudinally spaced apart along its length, the configuration of each pair of notches conforming to the V-shaped cross-section of the first elongated members, each pair of V-shaped notches in each second elongated member nestingly receives a different one of the first elongated members;

the first elongated members and second elongated members of the exit header cooperate to define a plurality of generally rectangular exit apertures.

3. The silencer device of claim 1, wherein the entrance header further comprises:

(a) each end of each first elongated member being chamfered with a slope substantially equal to one half of the included angle of the V-shaped cross-section of the first elongated member;

(b) each end of each second elongated member being chamfered with a slope substantially equal to one half of the included angle of the V-shaped cross-section of the second elongated member;

(c) a peripheral frame comprising:

a first pair of parallel spaced apart elongated generally planar members, each generally planar member of the first pair being disposed parallel to the second elongated members, one plate member being attached to one of the chamfered ends of each of the first elongated members, and the other plate member of the first pair of elongated members being attached to the other one of the chamfered ends of each of the first elongated members; and, a second pair of parallel spaced apart elongated flat plate members, each plate member of the second pair being disposed parallel to the first elongated members, one plate member being attached to one of the chamfered ends of the second elongated members, and the other plate member of the second pair being disposed parallel to the first elongated members and attached to the other chamfered ends of the second elongated members.

4. The silencer device of claim 2, wherein the exhaust header comprises:

(a) each end of each first elongated member being chamfered with a slope substantially equal to one half of the included angle of the V-shaped cross-section of the first elongated member;

(b) each end of each second elongated member being chamfered with a slope substantially equal to one half of the included angle of the V-shaped cross-section of the second elongated member;

(c) a peripheral frame comprising:

a first pair of parallel spaced apart elongated flat plate members, each plate member of the first pair being disposed parallel to the second elongated members, one plate member being attached to one of the chamfered ends of the first elongated members, and the other plate of the first pair being attached to the other chamfered ends of the first elongated members; and, a second pair of parallel spaced apart elongated flat plate members, each plate member of the second pair being disposed parallel to the first elongated members, one plate member being attached to one of the chamfered ends of the first elongated members, and the other plate member of the second pair being attached to the other chamfered ends of the first elongated members.

5. The silencer device of claim 4 wherein:

each second elongated member of the entrance header further comprises a mounting flange extending from between adjacent longitudinally spaced apart notches of each longitudinally spaced apart pair of V-shaped notches in a direction axially of the housing toward the downstream end of the housing; and, each second elongated member of the exhaust header further comprises a mounting flange extending from between adjacent longitudinally spaced apart notches of each longitudinally spaced apart pair of V-shaped notches in a direction axially of the housing toward the upstream end of the housing.

6. The silencer device of claim 4 wherein:

each chamfered end of each first elongated member of the entrance header has two oppositely extending attaching flange projecting generally transversely of the longitudinal axis of the first elongated member in a direction generally outwardly from the first elongated member for attaching each of the opposite chamfered ends of the first elongated member to a different one of the first pair of elongated flat plate members;

each chamfered end of each second elongated member of the entrance header has two oppositely extending attaching flanges projecting generally transversely of the longitudinal axis of the second elongated member in a direction generally outwardly from the second elongated member for attaching each of the opposite chamfered ends of the second elongated member to a different one of the second pair of elongated flat plates;

each chamfered end of each first elongated member of the exhaust header has two oppositely extending attaching flanges projecting generally transversely of the longitudinal axis of the first elongated member in a direction generally outwardly from the first elongated member for attaching each of the opposite chamfered ends of the first elongated member to a different one of the first pair of elongated flat plate members; and, each chamfered end of each second elongated member of the exhaust header has two oppositely extending attaching flanges projecting generally transversely of the longitudinal axis of the second elongated member in a direction generally outwardly from the second elongated member for attaching each of the opposite chamfered ends of the second elongated member to a different one of the second pair of elongated flat plate members.

7. The silencer device of claim 6 wherein:

each end of each one of the second elongated flat plate members of the entrance header is chamfered with a slope substantially equal to the slope of the chamfered ends of the first pair of elongated members;

each chamfered end of each of the second elongated flat plate members of the entrance header has an attaching flange extending generally transversely to the longitudinal axis of the second elongated plate member for attaching each end of each second elongated flat plate member to the adjacently disposed one of the pair of first elongated flat plate members, each end of each one of the second elongated flat plate members of the exhaust header is chamfered with a slope substantially equal to the slope of the chamfered ends of the first pair of elongated members; and, each chamfered end of each of the second elongated flat plate members of the exhaust header has an attaching flange extending generally transversely from the longitudinal axis of the second elongated plate member for attaching each end of each second elongated flat plate member to the adjacently disposed one of the pair of first elongated flat plate members.

8. The silencer device of claim 3, further comprising:

a plurality of parallel elongated open ended fluid flow tubes interconnecting the entrance header with the outlet header to provide fluid flow paths through the housing, each of the fluid flow tubes being of generally rectangular cross-sectional shape and having foraminous longitudinal walls, one end of each of the flow tubes being open and in registration with a different one of the rectangular entrance apertures of the entrance header, and the other end of each of the flow tubes being open and in registration with a different one of the rectangular exhaust apertures of the exhaust header.

9. The silencer device of claim 6, further comprising:

a plurality of parallel elongated open ended fluid flow tubes interconnecting the entrance header with the outlet header to provide fluid flow paths through the housing, each of the fluid flow tubes being of generally rectangular cross-sectional shape and having foraminous longitudinal walls, one end of each of the flow tubes being open and in registration with a different one of the rectangular entrance apertures and mounted to the mounting flanges extending from the second elongated members bordering the entrance aperture in which that open end of that flow tube is in registration and the other end of each of the flow tubes being open and in registration with a different one of the rectangular exhaust apertures and mounted to the mounting flanges extending from the second elongated members bordering the exhaust aperture in which the open end of that flow tube is in registration.

* * * * *